United States Patent
Sharma et al.

(10) Patent No.: US 12,413,569 B2
(45) Date of Patent: Sep. 9, 2025

(54) SINGLE SIGN-ON BETWEEN 2 INDEPENDENT STATES

(71) Applicant: Oracle International Corporation, Redwood Shores, CA (US)

(72) Inventors: Shobhank Sharma, Kirkland, WA (US); Venkata Subbarao Evani, Fremont, CA (US); Kranthi Kiran Pandiri, Redmond, WA (US); Girish Nagaraja, Sammamish, WA (US); Nagaraj Pattar, Karnataka (IN); Martinus Petrus Lambertus van den Dungen, Redmond, WA (US); Ashok Kumar Subbaiyan, Tamil Nadu (IN); Ghazanfar Ahmed, Redmond, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 122 days.

(21) Appl. No.: 17/955,820

(22) Filed: Sep. 29, 2022

(65) Prior Publication Data

US 2023/0103886 A1  Apr. 6, 2023

Related U.S. Application Data

(60) Provisional application No. 63/250,604, filed on Sep. 30, 2021.

(51) Int. Cl.
*H04L 9/40*  (2022.01)
*H04L 9/32*  (2006.01)

(52) U.S. Cl.
CPC ........ *H04L 63/0815* (2013.01); *H04L 9/3213* (2013.01)

(58) Field of Classification Search
CPC .. H04L 63/0815; H04L 9/3213; H04L 9/0894
See application file for complete search history.

(56) References Cited

U.S. PATENT DOCUMENTS

| | | |
|---|---|---|
| 8,474,018 B2 | 6/2013 | Mardikar et al. |
| 8,732,800 B1 | 5/2014 | Askew |

(Continued)

FOREIGN PATENT DOCUMENTS

| | | |
|---|---|---|
| CN | 110336820 A | 10/2019 |
| EP | 3528454 A1 | 8/2019 |
| WO | 2018053122 A1 | 3/2018 |

OTHER PUBLICATIONS

Roei Schuster, Vitaly Shmatikov, and Eran Tromer. 2018. Situational Access Control in the Internet of Things. In Proceedings of the 2018 ACM SIGSAC Conference on Computer and Communications Security (CCS '18). Association for Computing Machinery, New York, NY, USA, 1056-1073. (Year: 2018).*

(Continued)

*Primary Examiner* — Haresh N Patel
(74) *Attorney, Agent, or Firm* — Kilpatrick Townsend & Stockton LLP

(57) ABSTRACT

Systems and methods for single sign-on between two independent systems are disclosed herein. The method can include receiving a request to access a first application of a first system having a first login protocol. The method can include receiving user login credentials and authenticating the user login credentials. The method can include logging the user in to the first system and a second system based on the received login credentials. The second system can have a second login protocol independent of the first login protocol.

14 Claims, 13 Drawing Sheets

(56) References Cited

U.S. PATENT DOCUMENTS

| | | |
|---|---|---|
| 8,776,201 B2 | 7/2014 | Gao et al. |
| 8,990,911 B2 | 3/2015 | Olden et al. |
| 9,053,302 B2 | 6/2015 | Sastry et al. |
| 9,491,200 B2 | 11/2016 | Mardikar et al. |
| 9,560,036 B2 | 1/2017 | Hinton et al. |
| 9,781,122 B1 | 10/2017 | Wilson et al. |
| 9,838,376 B1 | 12/2017 | Lander et al. |
| 10,225,242 B2 | 3/2019 | Grim et al. |
| 10,255,061 B2 | 4/2019 | Lander et al. |
| 10,341,410 B2 | 7/2019 | Lander et al. |
| 10,425,386 B2 | 9/2019 | Wardell et al. |
| 10,454,940 B2 | 10/2019 | Lander et al. |
| 10,484,243 B2 | 11/2019 | Cole et al. |
| 10,484,382 B2 | 11/2019 | Wilson et al. |
| 10,511,589 B2 | 12/2019 | Gangawane et al. |
| 10,594,684 B2 | 3/2020 | Bansal et al. |
| 10,616,224 B2 | 4/2020 | Subramanian et al. |
| 10,715,564 B2 | 7/2020 | Mohamad Abdul et al. |
| 10,798,165 B2 | 10/2020 | Srinivasan et al. |
| 10,846,390 B2 * | 11/2020 | Subramanian .......... G06F 16/86 |
| 10,878,079 B2 | 12/2020 | Vepa et al. |
| 10,931,656 B2 | 2/2021 | Carru et al. |
| 11,061,929 B2 | 7/2021 | Xu et al. |
| 11,108,828 B1 | 8/2021 | Curtis et al. |
| 11,165,634 B2 | 11/2021 | Medam et al. |
| 11,308,132 B2 | 4/2022 | Srinivasan et al. |
| 11,321,343 B2 | 5/2022 | Srinivasan et al. |
| 11,599,677 B2 | 3/2023 | Buscaglia et al. |
| 11,606,391 B2 | 3/2023 | Greenebaum et al. |
| 11,627,123 B2 | 4/2023 | Stayskal et al. |
| 11,847,239 B2 | 12/2023 | Grand |
| 11,962,624 B2 | 4/2024 | Kuehr-McLaren et al. |
| 2005/0154913 A1 | 7/2005 | Barriga et al. |
| 2006/0074894 A1 | 4/2006 | Remahl et al. |
| 2007/0056018 A1 | 3/2007 | Ridlon et al. |
| 2007/0143291 A1 | 6/2007 | Browne |
| 2008/0276296 A1 | 11/2008 | Larsen |
| 2009/0249060 A1 | 10/2009 | Dossett et al. |
| 2013/0227658 A1 | 8/2013 | Leicher et al. |
| 2013/0283350 A1 | 10/2013 | Afek et al. |
| 2014/0075942 A1 | 3/2014 | Rewers et al. |
| 2014/0181003 A1 | 6/2014 | Kling et al. |
| 2015/0089575 A1 | 3/2015 | Vepa et al. |
| 2015/0215348 A1 | 7/2015 | Koeten et al. |
| 2015/0350338 A1 | 12/2015 | Barnett et al. |
| 2016/0072839 A1 * | 3/2016 | Mortimore, Jr. .... H04L 63/0876 726/1 |
| 2016/0277390 A1 | 9/2016 | Minov et al. |
| 2016/0359861 A1 | 12/2016 | Manov et al. |
| 2017/0063931 A1 | 3/2017 | Seed et al. |
| 2017/0177894 A1 | 6/2017 | Stock et al. |
| 2017/0230419 A1 | 8/2017 | Prafullchandra et al. |
| 2017/0329957 A1 * | 11/2017 | Vepa .................... G06F 21/445 |
| 2017/0331832 A1 | 11/2017 | Lander et al. |
| 2018/0081905 A1 | 3/2018 | Kamath et al. |
| 2018/0144150 A1 | 5/2018 | Aakolk et al. |
| 2018/0234416 A1 | 8/2018 | Moerk et al. |
| 2019/0068377 A1 | 2/2019 | Matsugashita et al. |
| 2019/0073468 A1 | 3/2019 | Kazerani et al. |
| 2019/0273746 A1 | 9/2019 | Coffing |
| 2019/0362087 A1 | 11/2019 | Ferrans et al. |
| 2020/0007530 A1 * | 1/2020 | Mohamad Abdul .......... H04W 12/084 |
| 2020/0053091 A1 | 2/2020 | Childress et al. |
| 2020/0120098 A1 | 4/2020 | Berg et al. |
| 2020/0264860 A1 | 8/2020 | Srinivasan et al. |
| 2021/0044595 A1 | 2/2021 | Childress et al. |
| 2021/0081252 A1 | 3/2021 | Bhargava et al. |
| 2021/0084031 A1 | 3/2021 | Lao et al. |
| 2021/0234706 A1 * | 7/2021 | Nair .................... H04L 9/0825 |
| 2021/0377044 A1 * | 12/2021 | Leibmann ............ H04L 9/3247 |
| 2022/0116376 A1 | 4/2022 | Stayskal et al. |
| 2022/0210194 A1 | 6/2022 | Parekh et al. |
| 2022/0210195 A1 | 6/2022 | Parekh et al. |
| 2022/0210196 A1 | 6/2022 | Parekh et al. |
| 2022/0239640 A1 | 7/2022 | Wang et al. |
| 2022/0247787 A1 | 8/2022 | Lippert et al. |
| 2023/0103886 A1 | 4/2023 | Sharma et al. |
| 2025/0080530 A1 | 3/2025 | Trinelli et al. |

OTHER PUBLICATIONS

Access Control, Google Cloud, Available Online at: https://cloud.google.com/kubernetes-engine/docs/concepts/access-control, Accessed from Internelon Sep. 16, 2021, 3 pages.

AWS IAM Identity Center (Successorto AWS Single Sign-On), Centrally Manage Workforce Access to Multiple AWS Accounts and Applications, Available Online at: https://aws.amazon.com/iam/identity-center/, Accessed from Internet on Dec. 20, 2022, 7 pages.

How does SAML Single Logout Requestwork?, Available Online at: https://support.servicenow.com/kbid=kb_article_view&sysparm_article=KB0788164, Sep. 20, 2021, 2 pages.

How Does Single Sign-on Work?, How Single Sign-on Works, Step by Step, Available online at https://www.onelogin.com/learn/how-single-sign-on-works, Accessed from Internelon Sep. 20, 2021, pp. 1-5.

IDM365 Identity and Access Managementfor the RBAC/ABAC Hybrid Solution, IDM 365, Available Online at: https://idm365.com/idm365-the-rbac-abac-hybrid-solution/, Accessed from Internet on Sep. 20, 2021, 5 pages.

IdP Single Logout (SLO), Available Online at: https://docs.pingidentity.com/bundle/integrations/page/gdz1563995023643.html, Jul. 24, 2019, 1 page.

Multicloud Identity and Access Management Architecture, IBM Cloud, Available Online at: https://www.ibm.com/cloud/architecture/architectures/security-iam/reference-architecture, Accessed from Internet on Sep. 16, 2021, 4 pages.

OpenID Connect Single Logout, Available Online at: https://is.docs.wso2.com/en/latest/learn/openid-connect-single-logout/, 2021, 18 pages.

Single Logout (SLO), Available Online at: https://identitydocs.akamai.com/gettingstarted/sessions/3logout/page2-slo/, Accessed from Internet on Sep. 20, 2021, 2 pages.

Single Sign-On SSO, JWT SSO, Available Online at: https://www.miniorange.com/saml-identity-provider-with-jwt-protocol, Accessed from Internet on Sep. 20, 2021, 7 pages.

Single Sign-Out SAML Protocol, Microsoft Docs, Available Online at: https://docs.microsoft.com/enus/azure/activedirectory/develop/single-sign-out-saml-protocol, Aug. 24, 2021, 3 pages.

The Definitive Guide to Attribute-Based Access Control (ABAC), Nextlabs, Available Online at: https://www.nextlabs.com/products/technology/abac/, Accessed from Internet on Sep. 16, 2021, 10 pages.

Use IdP-Initiated Single Logout (SLO), Available Online at: https://help.sap.com/viewer/6d6d63354d1242d185ab4830fc04feb1/Cloud/enUS/da2e4f9866dc45f0b4723ca41f051bea.html, Accessed from Internet on Sep. 20, 2021, 1 page.

User Management Service Single Sign-on, IBM Documentation, Available online at https://www.ibm.com/docs/en/cloud-paks/1.0?topic=services-ums-single-sign, Accessed from Internet on Sep. 20, 2021, pp. 1-3.

What is Azure Attribute-Based Access Control (Azure ABAC)?, Microsoft Docs, Available Online at: https://docs.microsoft.com/en-us/azure/role-based-access-control/conditions-overview, May 13, 2021, 7 pages.

What is Azure role-based Access Control (Azure RBAC)?, Microsoft, Available Online at: https://docs.microsoft.com/en-us/azure/role-based-access-control/overview, May 17, 2021, 7 pages.

Why SSO is only Part of Multi-Cloud Identity, Available Online at: https://www.strata.io/resources/blog/multi-cloud-identity/sso-only-part-of-multi-cloud-identity/, Jun. 1, 2021, 6 pages.

Parker, A Guide to Authorization: A Discussion of New Best Practices Using Hybrid Role and Attribute Techniques Available Online at: https://f.hubspotusercontent10.net/hubfs/174819/docs/A%20Guide%20To%20Authorization%20by%20EmpowerID.pdf, Mar. 2021, 64 pages.

Van Blijderveen et al., How to Scale Your Authorization Needs by Using Attribute-Based Access Control With S3, Available Online at:

(56) References Cited

OTHER PUBLICATIONS https://aws.amazon.com/blogs/security/how-to-scale-authorization-needs-using-attribute-based-access-control-with-s3/, Mar. 18, 2021, 13 pages.

Hu et al., Multiparty Authorization Framework for Data Sharing in Online Social Networks, Data and Applications Security and Privacy XXV, Jul. 11, 2011, pp. 29-43.

Moghaddam et al., A Multi-Layered Policy Generation and Management Engine for Semantic Policy, Digital Communications and Networks, vol. 6, No. 1, Feb. 1, 2020, pp. 38-50.

International Application No. PCT/US2022/045348, International Search Report and Written Opinion mailed on Jan. 19, 2023, 13 pages.

International Application No. PCT/US2022/045370, International Search Report and Written Opinion mailed on Jan. 23, 2023, 13 pages.

Wu et al., A Trust-Evaluation-Enhanced Blockchain-Secured Industrial IoT System, IEEE Internet of Things Journal, vol. 8, No. 7, Oct. 13, 2020, pp. 5510-5517.

AWS Single Sign-On, AWS, Available Online at https://aws.amazon.com/single-sign-on/, Accessed from Internet on Sep. 20, 2021, pp. 1-11.

Shoemaker, Introduction to IndexedDB: The In-Browser Database, CODE Magazine, Available Online at: https://www.codemag.com/article/1411041/Introduction-to-IndexedDB-The-In-Browser-Database, Aug. 31, 2021, 27 pages.

International Application No. PCT/US2022/045348, "International Preliminary Report on Patentability", Apr. 11, 2024, 9 pages.

International Application No. PCT/US2022/045370, "International Preliminary Report on Patentability", Apr. 11, 2024, 10 pages.

U.S. Appl. No. 17/957,146, Final Office Action, Mailed On Mar. 7, 2025, 24 pages.

U.S. Appl. No. 17/957,146, Non-Final Office Action, Mailed On Sep. 23, 2024, 19 pages.

U.S. Appl. No. 17/957,522, Non-Final Office Action, Mailed On Sep. 10, 2024, 12 pages.

Bailey et al., "Self-Adaptive Authorization Framework for Policy Based RBAC/ABAC Models", Institute of Electrical and Electronics Engineers Ninth International Conference on Dependable, Autonomic and Secure Computing, Dec. 12, 2011, pp. 37-44.

Pal et al., "On Design of A Fine-Grained Access Control Architecture for Securing IoT-Enabled Smart Healthcare Systems", In Proceedings of the 14th EAI International Conference on Mobile and Ubiquitous Systems: Computing, Networking and Services, Nov. 7, 2017, 10 pages.

Paul, "Authentication and Authorization for the Front-end Web Developer", School of Science, 2020, 61 page.

Wang et al., "Private Set Intersection With Authorization Over Outsourced Encrypted Datasets", Institute of Electrical and Electronics Engineers Transactions on Information Forensics and Security, vol. 16, Jul. 28, 2021, pp. 4050-4062.

U.S. Appl. No. 17/957,522, Non-Final Office Action mailed on Apr. 17, 2025, 15 pages.

Long et al., RACAC: An Approach toward RBAC and ABAC Combining Access Control, Institute of Electrical and Electronics Engineers 5th International Conference on Computer and Communications, Dec. 6, 2019, pp. 1609-1616.

Qi et al., Access Control Model Based on Role and Attribute and Its Applications on Space-Ground Integration Networks, 4th International Conference on Computer Science and Network Technology, vol. 1, Dec. 19, 2015, pp. 1118-1122.

U.S. Appl. No. 17/896,969, Notice of Allowance mailed on Jul. 17, 2025, 15 pages.

* cited by examiner

SINGLE SIGN-ON BETWEEN 2 INDEPENDENT STATES

CROSS-REFERENCES TO RELATED APPLICATIONS

This application claims the benefit of U.S. Provisional Application No. 63/250,604, Filed on Sep. 30, 2021, and entitled "Single Sign-On Between Independent Systems," the entirety of which is hereby incorporated by reference herein.

BACKGROUND OF THE INVENTION

The adoption of cloud services has seen a rapid uptick in recent times. Various types of cloud services are now provided by different cloud service providers (CSPs). The term cloud service is generally used to refer to a service or functionality that is made available by a CSP to subscribing customers on demand, typically using a subscription model, using systems and infrastructure (commonly referred to as cloud infrastructure) provided by the CSP. Typically, the servers and systems included in the CSP-provided cloud infrastructure that is used to provide a cloud service to a subscribing customer are separate from the customer's own on-premise servers and systems. The CSP-provided infrastructure can include compute, storage, and networking resources. Customers can thus avail themselves of cloud services provided by the CSP without having to purchase their own hardware and software resources for the services. Cloud services are designed to provide a subscribing customer easy, scalable, and on-demand access to applications and computing resources without the customer having to invest in procuring the infrastructure for providing the services or functions. Various types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

Different services offered by a CSP may have different login procedures and/or login requirements. In some instances, these different procedures and/or requirements can result in an unsatisfactory customer experience. Accordingly, further improvements are desired.

BRIEF SUMMARY

Aspects of the present disclosure relate to a method. The method can include receiving a request to access a first application of a first system having a first login protocol, receiving user login credentials, authenticating the user login credentials, and logging the user in to the first system and a second system based on the received login credentials. In some embodiments, the second system has a second login protocol independent of the first login protocol.

In some embodiments, the user login credentials are authenticated by the first system. In some embodiments, the user login credentials are authenticated by the second system. In some embodiments, the second system establishes an authenticated session for the user on the first system via the exchange at least one token between the second system and the first system.

In some embodiments, logging the user in to the first system and the second system based on the received login credentials includes generating a public/private key pair with the first application. In some embodiments, generating a public/private key pair starts a first OAuth flow between the user and the first system. In some embodiments, logging the user in to the first system and the second system based on the received login credential further includes starting a second OAuth flow between the first system and the second system. In some embodiments, the second OAuth flow is embedded in the first OAuth flow.

In some embodiments, logging the user in to the first system and the second system based on the received login credentials further includes sending the public key to the first system, and storing the public key in a cache of the first system. In some embodiments, the cache of the first system is accessible by the first system. In some embodiments, logging the user in to the first system and the second system based on the received login credentials further includes receiving an authenticating user credentials with the second system. In some embodiments, logging the user in to the first system and the second system based on the received login credentials further includes providing an authorization code from the second system to the first system upon successful authentication of the user credentials with the second system.

In some embodiments, logging the user in to the first system and the second system based on the received login credentials further includes providing a token from the second system to the first system in response to a request from the first system to the second system, the request including the authorization code. In some embodiments, logging the user in to the first system and the second system based on the received login credentials further includes translating the token from a first token type to a second token type. In some embodiments, the first token type is compatible with the second system. In some embodiments, the second token type is compatible with the first system.

In some embodiments, logging the user in to the first system and the second system based on the received login credentials further includes providing the translated token to the user and redirecting the user to the requested application. In some embodiments, the token provided by the second system to the first system includes the public key. In some embodiments, the first system includes an attribute-based access control (ABAC) system. In some embodiments, the first system includes a role-based access control (RBAC) system.

One aspect of the present disclosure relates to a system. The system can include a first access control system having a first login protocol. The first access control system includes at least one first processor and a memory including a plurality of instructions executable by the at least one first processor. The system can include a second access control system. The second access control system has a second login protocol independent of the first login protocol. The first access control system can receive a request to access a first application of the first access control system, receive user login credentials, authenticate the user login credentials, and log the user in to the first access control system and to the second access control system based on the received login credentials.

One aspect of the present disclosure relates to a non-transitory computer-readable storage medium storing a plurality of instructions executable by one or more processors. The plurality of instructions when executed by the one or more processors cause the one or more processors to receive a request to access a first application of a first system having a first login protocol, receive user login credentials, authenticate the user login credentials, and log the user in to the first system and a second system based on the received login credentials. In some embodiments, the second system has a second login protocol independent of the first login protocol.

DETAILED DESCRIPTION

Figure 1:
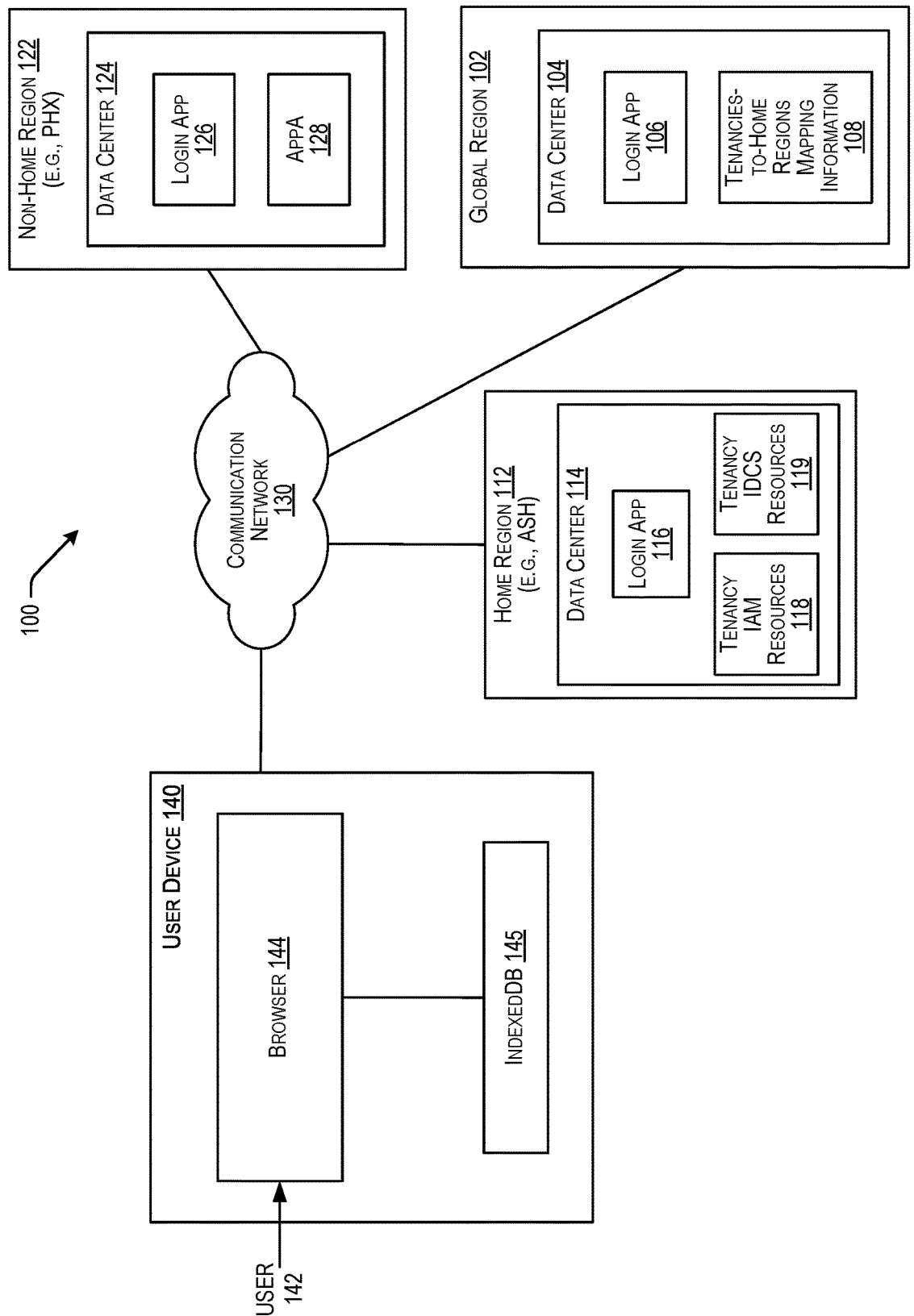
FIG. 1 is a simplified block diagram of a distributed multi-region environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to cloud computing, and specifically relates to sign-on to independently authenticated systems, and more specifically relates to a single sign-on to independently authenticated systems.

A CSP provides the infrastructure and resources that are used for providing cloud services to subscribing customers. The CSP-provided resources can include hardware and software resources. These resources can include, for example, compute resources (e.g., computer systems, virtual machines, containers, applications, processors), memory resources (e.g., databases, data stores), networking resources (e.g., routers, load balancers), identity and access management resources, and other resources. The resources provided by a CSP for providing a set of cloud services to subscribing customers are typically organized into data centers, each data center comprising one or more computing systems or host machines. A data center may be configured to provide a particular set of cloud services. The CSP is responsible for equipping and configuring the data center with compute, memory, and networking and resources that are used to provide that particular set of cloud services. A CSP may provide one or more data centers depending upon the number of subscribing customers and based upon the locations of the customers.

Data centers provided by a CSP may be hosted in different geographical regions. A region may refer to a particular geographic area and may be identified by a region name. Regions are generally independent of each other and can be separated by vast distances, such as across countries or even continents. Examples of regions for a CSP may include US West, US East, Australia East, Australia Southeast, and the like. In certain implementations, a collection of regions is referred to as a realm. A realm can include one or more regions. Accordingly, a CSP may provide a realm comprising one or more regions, with each region including one or more data centers.

Each data center is thus associated with a region. A CSP may deploy one or more data centers in a region, where the data centers are located within some certain geographic area (e.g., a city) within the region. For example, a particular CSP may have multiple regions such as US West region, US East region, Australia East region, Australia Southeast region, and the like. The CSP may deploy one or more data centers in each region, such as in a city within the region. For example, one or more data centers for the US West region may be located in San Jose, California; data centers for the US East region may be located in Ashburn, Virginia; one or more data centers for the Australia East region may be located in Sydney, Australia; one or more data centers for the Australia Southeast region may be located in Melbourne, Australia; and the like. The data centers in two different regions may provide the same or a different set of cloud services and resources to subscribing customers.

In certain implementations, in order to provide high availability to customers and for disaster recovery purposes, data centers within a region may further be organized into one or more availability domains, with an availability domain including one or more data centers. Availability domains within a region are isolated from each other, are made fault tolerant, and are architected in such a way that data centers in multiple availability domains in a region are very unlikely to fail simultaneously. For example, the availability domains within a region may be structured such that a failure at one availability domain within the region is unlikely to impact the availability of data centers in other availability domains within the same region.

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others.

In the cloud environment, an identity management system is generally provided by the CSP to control user access to resources provided or used by a cloud service. Typical services or functions provided by an identity management system include, without restriction, single sign-on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more two separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer currently has two separate accounts—one account with IAM for the IaaS subscription and a separate account with IDCS for the PaaS/SaaS subscription. Each account has its own credentials, such as user login, password, etc. The same customer thus has two separate sets of credentials. This results in an unsatisfactory customer experience and potentially an increase security risks as customers have to maintain two different sets of credentials and as credentials are maintained in two systems. Additionally, having two separate identity management system also creates obstacles for interactions between SaaS/PaaS and IaaS services.

For purposes of this application, and as examples, the two platforms will be referred to as IAM and IDCS. These names and terms are not intended to be limiting in any manner. The disclosure described herein applies to any two (or more) identity management systems that are to be integrated. The identity management systems or platforms may be provided by one or more CSPs.

In certain embodiments, an integrated identity management platform is provided that integrates the multiple identity management platforms (e.g., IAM and IDCS platforms) provided by the CSP in a manner that is transparent to the users or customers of the cloud services while retaining and offering the various features and functionalities offered by the two separate (e.g., IAM and IDCS) platforms. The integration thus provides a more seamless and enhanced user experience.

However, this integration is technically very difficult because the two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that don't have "approved" characteristics as defined by an organization's security policies. On the other hand, IDCS may be a role-based access control (RBAC) system which is a policy-neutral access-control mechanism defined around roles and privileges. The components of RBAC such as role-permissions, user-role and role-role relationships make it simple to perform user assignments. As yet another example, authentication and authorization frameworks or workflows (e.g., types of tokens that are used, different authentication frameworks such as OAUTH, etc.) used by the two platforms may be different. Accordingly, providing an integrated solution is technically very difficult.

To solve this problem, a single sign-on is developed. This single sign-on is effective whether the user signs on first to IAM or to IDCS. The single sign-on gathers user login information and provides this information to IDCS, which verifies the user login information. A session is established with the user, and information relating to this session is provided to IAM, thereby creating a logged-on session. Because the session the user can access either IDCS or IAM applications. The single sign-on logs a user into a tenancy in IAM and one or several distinct domains in IDCS.

Depending on whether the user attempts to login via an IAM application or an IDCS application, the back end workflow changes, but the user experience stays the same. Also, regardless of whether the user attempts to login via an IAM application or an IDCS application, credential processing occurs in IDCS.

Figure 11:
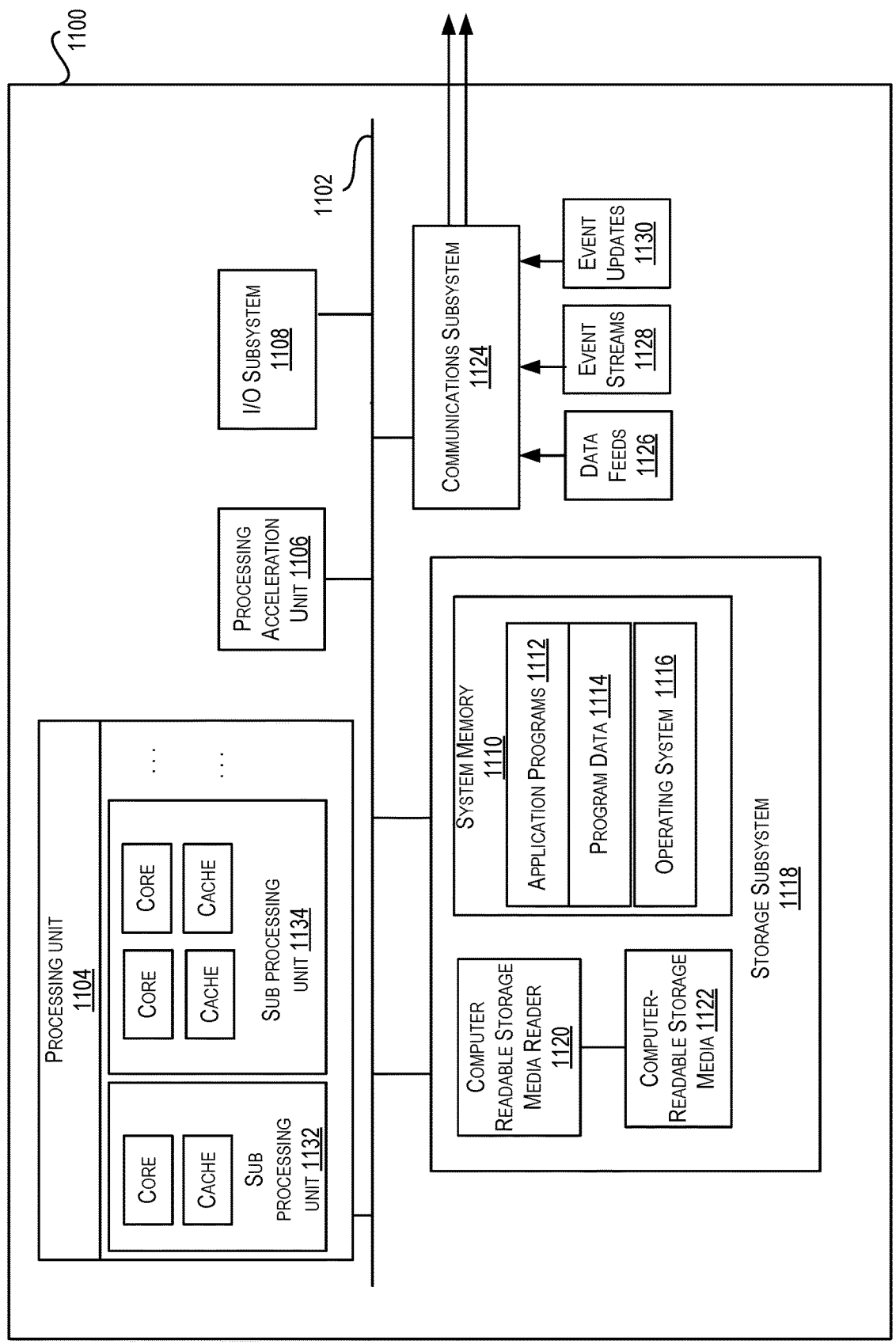
FIG. 11 is a block diagram illustrating an example computer system, according to at least one embodiment.

The term "data center," as used in this disclosure, refers to one or more computer systems that together are used to implement the data center. For example, a home region data center refers to one or more computer systems that are used to implement a data center in a home region. For example, a global region data center refers to one or more computer systems used to implement the global region data center. A computer system that makes up a data center can include one or more processors, and one or more memories capable of storing instructions that are executed by the one or more processors. An example of such a computer system is depicted in FIG. 11 and described below.

FIG. 1 is a simplified block diagram of a distributed multi-region environment 100 incorporating an exemplary embodiment. Distributed environment 100 depicts data centers in multiple regions that are communicatively coupled to each other via communication network 130. For sake of example, the regions depicted in FIG. 1 include a global region 102, a region 112 that is a home region for a particular tenancy, and a region 122 that is a non-home region for that tenancy (i.e., a region that is not the home region for the tenancy). For purposes of describing various features, it is assumed that non-home region 122 is Phoenix, USA, (identified by label "PHX"), and home region 112 is Ashburn, USA (identified by label "ASH").

Each of the regions depicted in FIG. 1 may include one or more data centers comprising infrastructure provided by a CSP for providing one or more cloud services on a subscription basis to subscribing customers. The infrastructure in a data center may include compute, memory, and networking resources provided by the CSP. For example, in FIG. 1, global region 102 includes a data center 104 (also referred to as global region data center 104), home region 112 includes a data center 114 (also referred to as home region data center 114), and non-home region 122 includes a data center 124 (also referred to as non-home region data center 124).

The data centers in the various regions may be communicatively coupled with one another and to user device 140 via communication network 130 that facilitates communications between the various computing systems. Communication network 130 can be of various types and can include one or more communication networks such as one or more public networks. Examples of communication network 130 include, without restriction, the Internet, a wide area network (WAN), a local area network (LAN), an Ethernet network, a wired network, a wireless network, and the like, and combinations thereof. Different communication protocols may be used to facilitate communications over communication network 130 including both wired and wireless protocols such as IEEE 802.XX suite of protocols, TCP/IP, IPX, SAN, AppleTalk®, Bluetooth®, and various other protocols. In general, communication network 130 may include any infrastructure that facilitates communications between the various systems depicted in FIG. 1.

In the embodiment depicted in FIG. 1, each data center hosts an identity and access management (IAM) application (referred as to as a login application in FIG. 1) that is configured to perform identity and access management functions such as login processing, sessions creation, authentication/authorization operations, and the like. In FIG. 1, global region data center 104 includes a login application 106 (also referred to as a global login application 106), home region data center 114 includes a login application 116 (also referred to as home region login application 116), and non-home region data center 124 includes a login application 126.

As described above, when a tenancy account is opened for a customer, a home region is associated with that tenancy. Typically, the identity and access management (IAM) artifacts configured for that tenancy are stored in a data center in the home region for that tenancy. These IAM artifacts may include, for example, login credentials, certificates, keys, etc. These artifacts are then used, for example, for performing login processing when creating a new session, authentication or authorization functions, and other identity and access management related functions for that tenancy. For example, when a user associated with a tenancy requests access to a protected resource, processing to enable the user to access the resource may involve processing (e.g., tenancy login processing and session creation) that may be performed using the IAM artifacts configured for that tenancy and which are stored in a home region data center in the home region for the tenancy.

In FIG. 1, it is assumed that region 112 is the home region for a tenancy T1, and thus IAM resources 118 and/or IDCS resources 119 for tenancy T1 are stored by home region data center 114. A region in a realm can be the home region for multiple tenancies. Also, within a realm, one region can be the home region for a first tenancy, a second different region can be the home region for a second tenancy, and so on. As previously indicated, in general, IAM artifacts and resources and/or IDCS artifacts and resources for a tenancy are stored in a data center in a home region associated with that tenancy.

In certain implementations, tenancies-to-home regions mapping information is used to map tenancies to their corresponding home regions. The tenancies-to-home regions mapping information may identify home regions and home region data centers for different tenancies. In some embodiments as described herein, the tenancies-to-home regions mapping information is stored at or accessible to a data center in the global region and does not have to be stored by the other data centers in the various regions in a realm. In some embodiments, any region can be the global region, and thus all regions can include information relating to tenancies-to-home region mapping. In the embodiment of FIG. 1, tenancies-to-home regions mapping information 108 is shown as being stored by global region data center 104 and not by the other data centers depicted in FIG. 1.

One or more resources (e.g., applications) may be hosted by the different data centers. These applications may be used by users associated with customers that have subscribed to one or more cloud services provided by a CSP. For example, in FIG. 1, an application "AppA" 128 is deployed at non-home region data center 124 in region 122. For purposes of the example depicted in FIG. 1, it is assumed that region 122 is a non-home region with respect to tenancy T1.

A user 142 associated with a customer tenancy can access one or more services or resources (e.g., AppA 128) provided by the various data centers depicted in FIG. 1 via a user device 140. User device 140 could be a computing device such as a laptop, a desktop, a mobile device, and the like. There are various ways in which a user, such as user 142, can access a resource, such as AppA 128. In certain use cases, user 142 may use an application (e.g., a browser) executing on user device 140 to access the resource. For example, in FIG. 1, user 142 can use a browser 144 to access AppA 128. User 142 may access AppA 128 by providing an URL endpoint corresponding to AppA 128 to browser 144, by click a link corresponding to AppA 128, and the like. API calls may also be made to access AppA 128.

AppA 128 may be a "protected" resource, where access to AppA 128 is controlled by an IAM application. A user, such as user 142, associated with a customer tenancy is typically identified by a user account or a user principal associated with the user. User 142 can access a protected resource, such as AppA 128, through this user account or user principal.

Browser 144 may be of different types. Commonly used browsers include Google Chrome, Mozilla Firefox, Microsoft Edge. Internet Explorer, Apple Safari, and others. Certain browser implementations may have an associated storage capability. For example, browser 144 has an in-browser storage represented by database 145. Information related to the various endpoints accessed using browser 144 or applications accessed using browser 144 may be stored in database 145 on user device 140 (referred to as client-side storage since saved on the user device).

Figure 2:
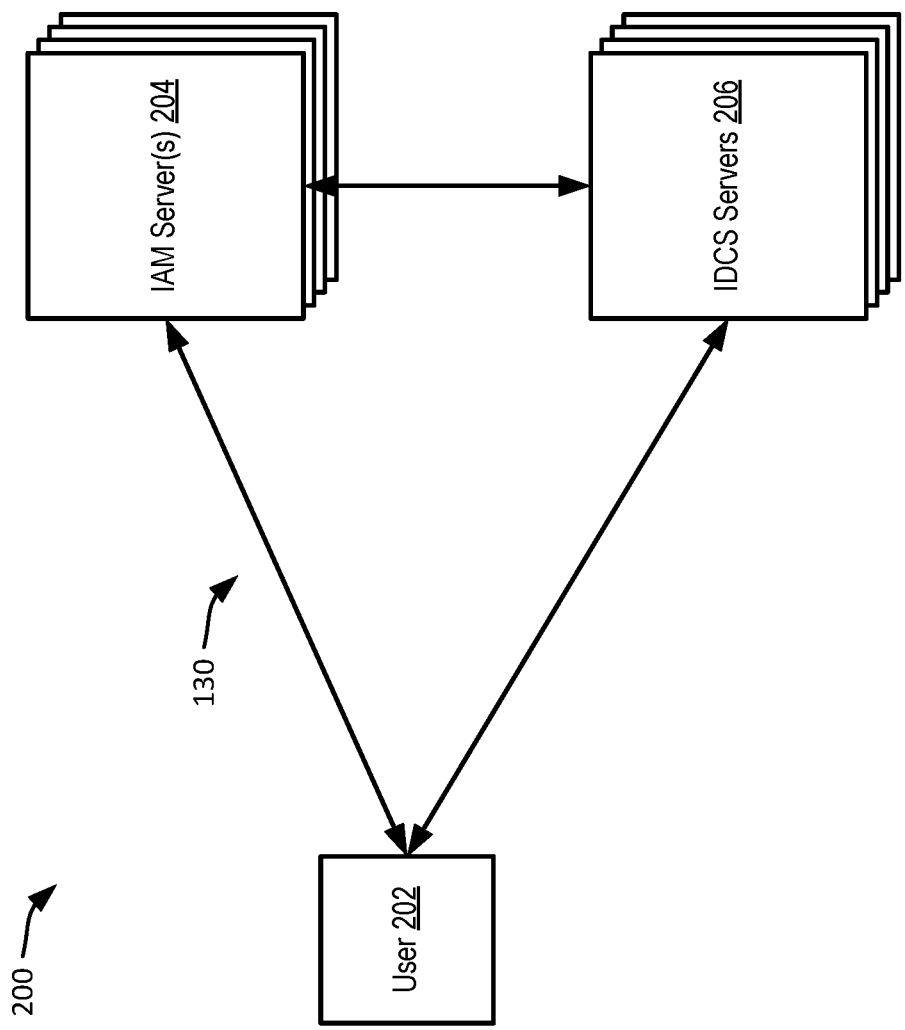
FIG. 2 is a schematic illustration of one embodiment of the system for integrated identity management.

With reference now to FIG. 2, a schematic illustration of one embodiment of the system for integrated identity management 200, also referred to herein as an integrated identity management platform 200 is shown. The system 200 includes a user device 202, which can be user device 140, one or several IAM servers 204, and one or several IDCS servers 206. In some embodiments, the user device 202 can comprise a computing device such as a laptop, a desktop, a mobile device, and the like. The one or several IAM servers 204 and/or the one or several IDCS servers 206 can each comprise one or several computing resources including, for example, one or several servers or server racks. The one or several IAM server 204 and/or the one or several ICDS servers 206 can be located in one or several of the global region 102, the home region 112, and/or the non-home region 122.

A user can, with user device 202, login via one or several IAM applications running on one or several IAM servers 204, or can login via one or several IDCS applications running on one or several IDCS servers 206. In some embodiments, the user device 202 can be directly connected with one or both of at least one IAM server 204 and at least one IDCS server 206 via, for example, a wired or wireless connection via, for example, a communication network 130. In some embodiments, the user device 202 can be directly connected with one or both of at least one IAM server 204 and at least one IDCS server 206 via, for example, one or several communication networks and/or one or several computer networks. In some embodiments, the user device 202 can be directly connected with one or both of at least one IAM server 204 and at least one IDCS server 206 via, for example, the internet.

In some embodiments, some or all of the IAM server(s) 204 and the IDCS server(s) 206 can be located at a same location, or at different locations. In some embodiments, some or all of the IAM server(s) 204 and the IDCS server(s) 206 can be located in different computing networks, different data centers, different regions, or the like. In some embodiments, and applying single sign-on between independent systems as disclosed herein, when a user logs into one of the IAM server(s) 204 and the IDCS server(s) 206, the user is automatically logged in to the other of the IAM server(s) or the IDCS server(s) 206.

Figure 3:
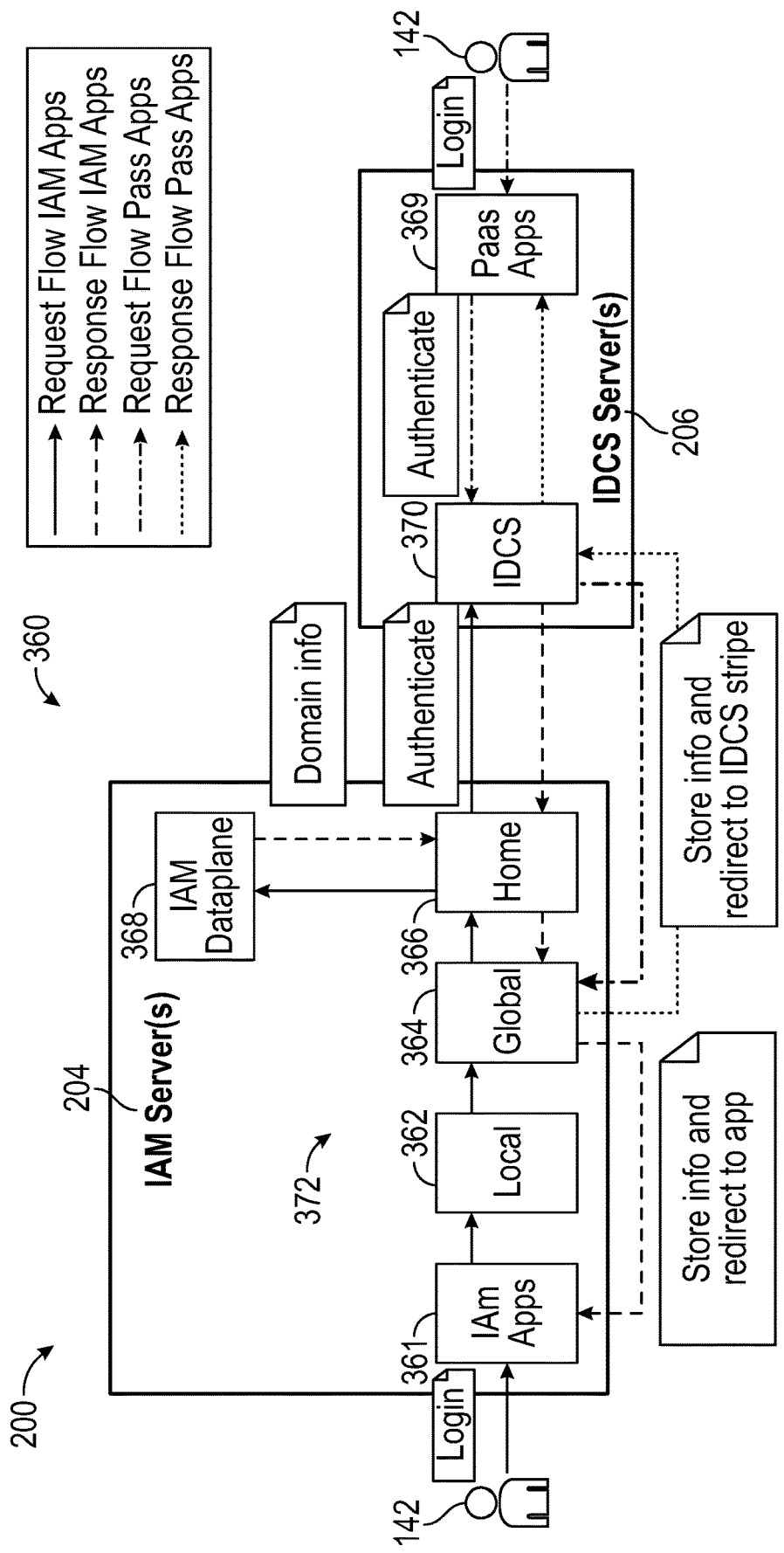
FIG. 3 is a high-level schematic of a login process for integrated identity management is shown as performed by a system for integrated identity management.

With reference now to FIG. 3, a high-level schematic 360 of this login process performed by system 200 is shown. A seen, the user 142 can login via either the IAM server(s) 204 or via the IDCS server(s) 206. The IAM servers 204 can run one or several IAM apps 361, and an IAM login system 372 which can include one or several instances of an IAM login service 362, 364, 366 and/or an IAM dataplane 368. This IAM login service can include, for example, a local instance 362, a global instance 364, and/or a home instance 366. In some embodiments, the local instance 362 can be running on a server in the same region as the server on which the IAM App 361 is running, the global instance 364 can be running on a server comprising a common global endpoint, and home instance 366 can be running in the home region of a tenancy that the user is trying to access. The IAM dataplane 368 can be the dataplane of the IAM server(s) 204. The IAM dataplane 368 can run on distinct hardware, or can be distributed across others of the IAM server(s) 204. The IAM dataplane 368 can process data requests for the IAM servers 204 and/or applications or domains on or associated with the IAM server(s) 204.

As seen in the above schematic, a user request for login received by the IAM app 361 can be routed through the local 362, global 364, and/or home 366 instances, and can initiate communications with both the IAM dataplane 368 and the IDCS 370. The IDCS 370 can perform the login operations, and can communicate the success or failure of the login operations to the IAM system 372, and specifically can communicate to the home instance 366 of the IAM login. From the other side, a user can request login via the Paas App 369, which request can be passed to the IDCS 370. The IDCS 370 can perform login operations, and depending on the success or failure of that login attempt, can communicate successful login to the IAM system 372 running on the IAM server(s) 204.

If the user is utilizing an IDCS application 369, the backed workflow for login is straightforward as the user application and/or browser is directly interacting with IDCS 370. If the user logs-in via an IAM application 361, the workflows are more complex as the user browser and/or application interacts with both IDCS 369 and one or several IAM login instances 362, 364, 366 in the IAM login system 372. Specifically, a user logging-in via an IAM application 361 is redirected to IDCS 370 which receives user login information. Tokens and authorization codes are transmitted between IAM login instances 362, 364, 366 and IDCS 370 to complete this login, and some of these tokens are translated from IDCS to IAM tokens to be useable by IAM instances 362, 364, 366. IAM login system 372 can include IAM login instances 362, 364, 366 and IAM dataplane 368. IAM login instances can, under some circumstances, be split amongst different hardware components and login via one or several IAM login instances 362, 364, 366 can include unique communication between these instances 362, 364, 366.

Charts outlining the login flow in greater detail are shown below.

From an IDCS Application

Figure 4:
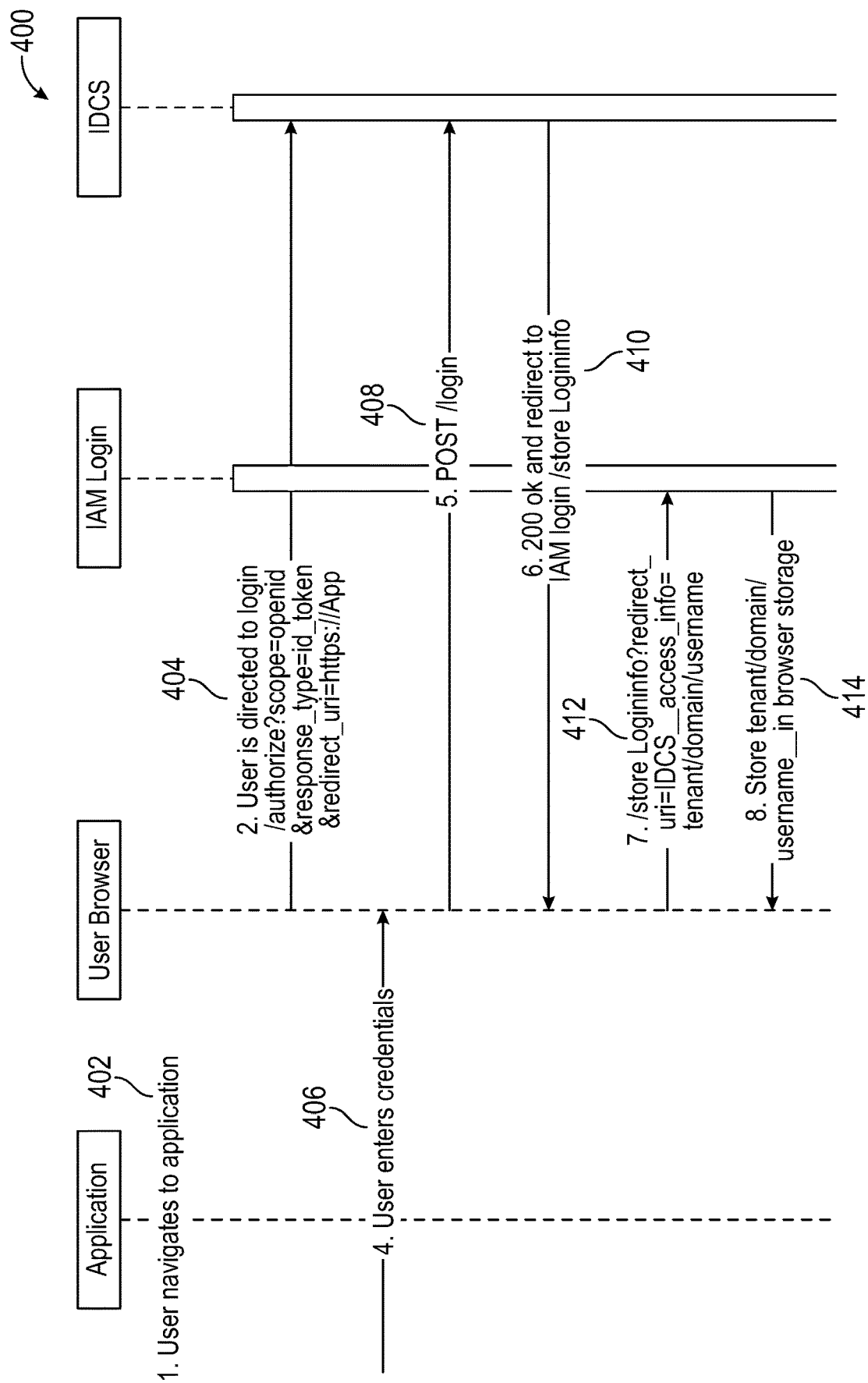
FIG. 4 is a flowchart illustrating one embodiment of a process for integrated identity management.

With reference now to FIG. 4, a flowchart illustrating one embodiment of a process 400 for integrated identity management is shown. The process 400 can be performed by all or portions of system 200 and can include portions of the process 360 depicted in FIG. 3. The process 400 begins when the user 142, via the user device 140 navigates to the IDCS protected application 369 as indicated in step 402. At step 404, the user's browser directs the user 142 to login via IDCS 370. This includes initiating an OAuth process between the user browser and the IDCS 370.

As indicated in step 406, the user can input their user credentials and/or other login information to the user browser. These user credentials can include, for example, a username, a user identifier, a password, or the like. In some embodiments, the user credentials can be provided to IDCS 370 for authentication as indicated in step 408. If the credentials are authenticated, IDCS 370 provides a 200 Ok response to the user browser and redirects the user browser to an instance of IAM login 362, 364, 366 as indicated in step 410.

At step 412, the user browser provides information to IAM login, and specifically can provide information such as the tenant, domain, and/or username to IAM login. In some embodiments, at step 412, login information for the user can be stored by IAM login. This information can indicate successful login by the user to IDCS 370. The IAM login 362, 364, 366 instance directs the user browser to store the tenant, domain, and/or username in browser storage at step 414, completing the login to the IDCS application.

From an IAM Application

Figure 5A:
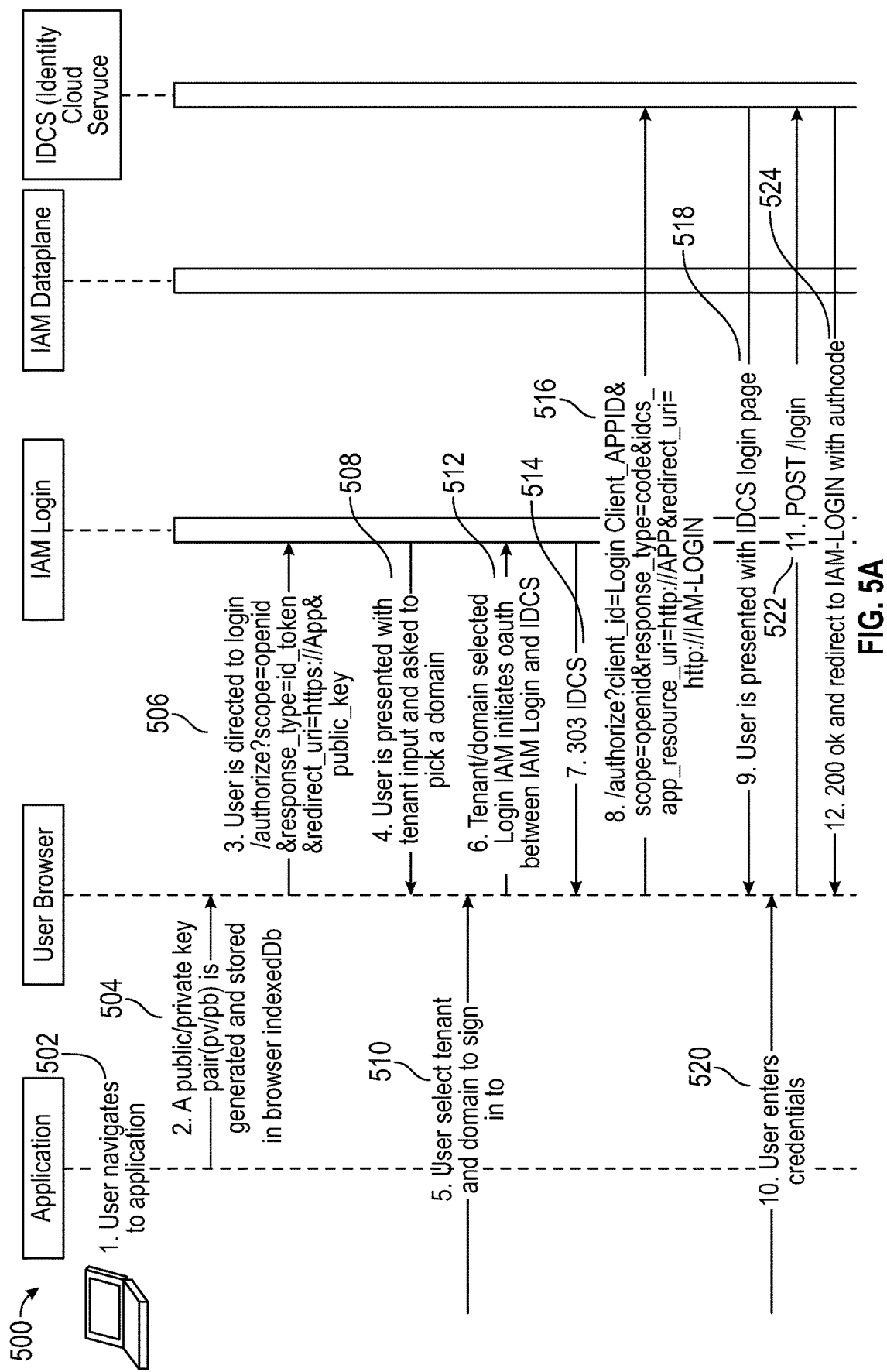
FIGS. 5A and 5B are a flowchart illustrating another embodiment of a process for integrated identity management.
Figure 5B:
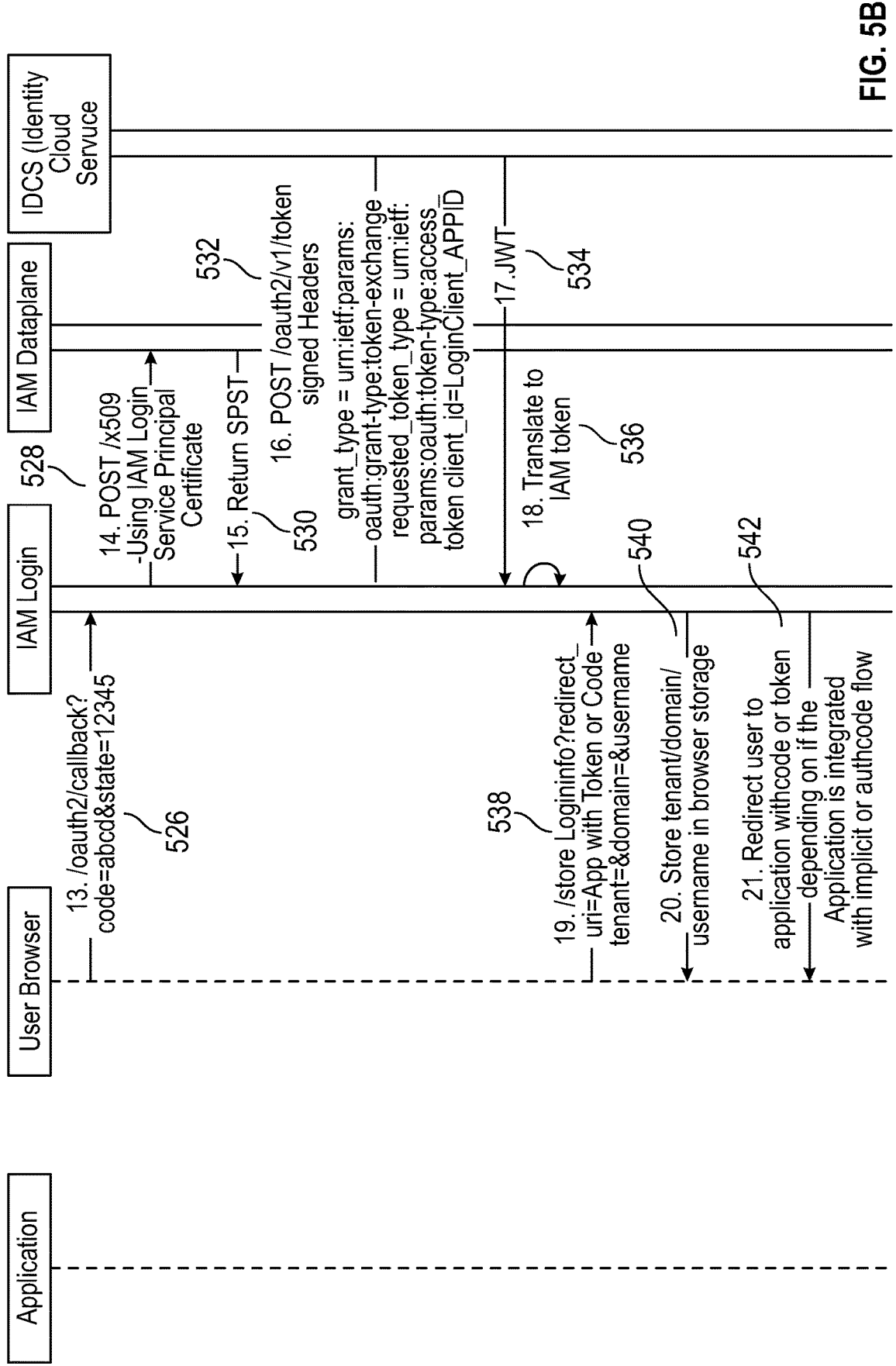

With reference now to FIGS. 5A and 5B, a flowchart illustrating another embodiment of a process 500 for integrated identity management is shown. The process 500 can be performed by all or portions of system 200 and can include portions of the process 360 depicted in FIG. 3. The process 500 begins when the user 142, via the user device 140 navigates to the IAM protected application 361 as indicated in step 502. At step 504, a public/private key pair is generated and stored in the user browser, and specifically within a cache of the user browser. The user browser then directs the user to IAM login, and specifically to an instance of IAM login 362, 364, 366 at step 506. This includes initiating an OAuth process between the application as client, user as resource owner, and instance of IAM login 362, 364, 366 as authorization server. This can, in some embodiments, be an implicit flow. In some embodiments, step 506 can further include sending the public key from the public/private key pair from the user browser to the instance of IAM login 362, 364, 366.

At step 508, the user is provided with a request for a tenant input and to pick a domain. In response to this, and via the browser, the user can select a domain and input a tenancy as indicated in step 510. These inputs can be provided by the user browser to the IAM login 362, 364, 366 as shown in step 512. Also at step 512, IAM login 362, 364, 366 initiates an OAuth flow between IAM login system 372 and IDCS 370, and/or between one of the IAM login instances 362, 364, 366 and IDCS 370. This can be the second OAuth protocol operating within method 500, and is, in some embodiments, embedded within the first OAuth protocol operating between the user browser and the IAM login.

At step 514 the user is directed to IDCS 370, and specifically, IAM redirects the user browser, via for example, a 303 response, to IDCS 370. At step 516, information is sent from the user browser to IDCS 370. This information can be, for example, information relating to the OAuth flow initiated in block 512. In some embodiments, this information does not include the public key created at step 504, rather the public key can, in some embodiments, remain with IAM login and/or with the user browser. In some embodiments, and as part of step 516, IDCS 370 can determine whether the application of step 502 is a valid and/or registered application, or in other words, that the application is in fact and IAM application.

At step 518 IDCS 370 provides user with a login page via user browser, and user provides their credentials to login to the browser as indicated in step 520. The user credentials are provided by the user browser to IDCS 370 for authentication as shown in step 522. If the user credentials are authenticated, IDCS 370 provides a 200 Ok response to the user browser and redirects the user browser to an instance of IAM login 362, 364, 366 as indicated in step 524. Additionally, the IDCS 370 provides an authorization code "authcode" to the user browser at step 524.

At step 526, authcode is provided by the user browser to the IAM login. In some embodiments, this can further include sending of a state of the user browser and/or of the application. In some embodiments, and at step 526 and as a part of the OAuth flow, the user browser provides a code, and specifically the authcode to the IAM login instance 362, 364, 366.

At step 528, the IAM login instance 362, 364, 366 requests a service principal security token (SPST) from the IAM dataplane 368, and at step 530, the IAM login instance 362, 364, 366 receives a service principal security token (SPST) from the IAM dataplane 368. In some embodiments, the request can be made with a service principal certificate. The IAM instance 362, 364, 366 utilizes the SPST to sign a request for a token from IDCS 370 in exchange for authcode in step 532. IDCS 370 validates the SPST and the request with the IAM dataplane 368. IDCS 370 then provides a token, which can be, for example, a JSON web token ("JWT") to the IAM instance 362, 364, 366 at step 534. The IAM instance 362, 364, 366 translates the JWT to an IAM token at step 536.

The user browser directs the IAM instance 362, 364, 366 to store the login information including for example, the tenant, domain, and/or user name in browser storage at step 538. At step 540, login information including for example, the tenant, domain, and/or user name is stored in the browser storage. At step 542, the IAM instance 362, 364, 366 can redirect the user to the application to which they were logging in along with the token and/or with the authcode.

Multi-Region Login

Figure 6A:
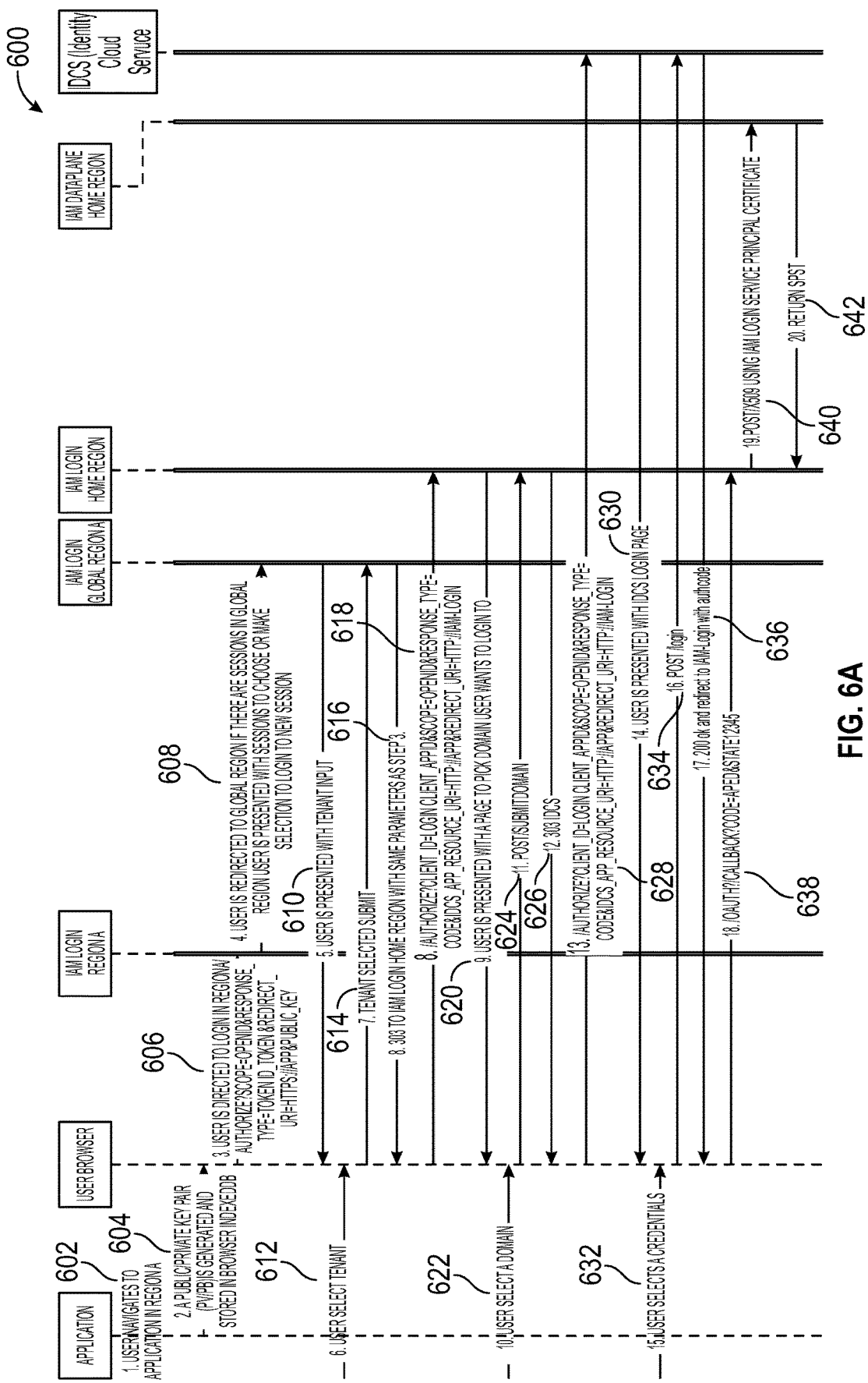
FIGS. 6A and 6B are a flowchart illustrating an embodiment of a multi-region process for integrated identity management.
Figure 6B:
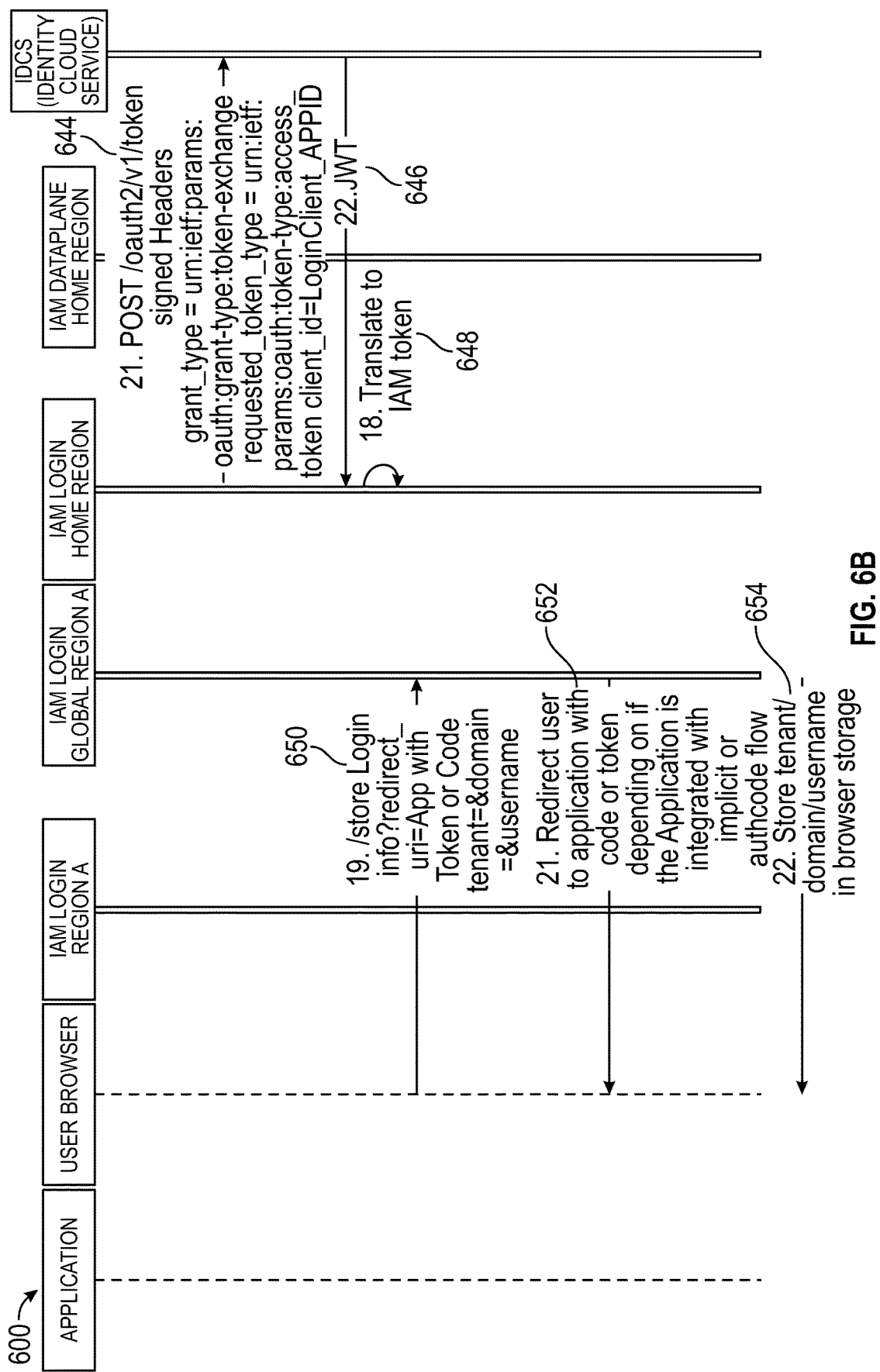

With reference now to FIGS. 6A and 6B, a flowchart illustrating an embodiment of a multi-region process 600 for integrated identity management is shown. The process 600 can be performed by all or portions of system 200 and can include portions of the process 360 depicted in FIG. 3. The process 600 begins when the user 142, via the user device 140 navigates to the IAM application 361 as indicated in step 602. As indicated, the IAM application 361 can be located in a first region, region A. Region A can, in some embodiments, include the local instance 362 of the IAM login. At step 604, a public/private key pair is generated and stored in the user browser, and specifically within a cache of the user browser. The user browser then directs the user to IAM login in region A, and specifically to an instance of IAM login in region A at step 606. This includes initiating an OAuth process between the application as client, the user as resource owner and the instance of IAM login in region A as authorization server. This can, in some embodiments, be an implicit flow. In some embodiments, step 606 can further include sending the public key from the public/private key pair from the user browser to the instance of IAM login in region A.

At step 608, the user is directed by the instance of IAM login in region A to the instance of IAM login in the global region. In some embodiments, and as a part of this step, the instance of IAM login in the global region can determine if there are any current sessions, and if so, can allow the user to select one of the current sessions or start a new session. At step 610, the instance of IAM login in the global region presents the user via the user browser with a request for a tenant input. In response to this, and via the browser, the user can input a tenancy as indicated in step 612. These inputs can be provided by the user browser to the instance of IAM login in the global region as shown in step 614.

At step 616 the user is directed to IAM login instance in the home region 366. In some embodiments, the IAM login in the global region redirect the user browser, via for example, a 303 response, to IAM home 366. At step 618 information is sent from the IAM global 364 to IAM home 366. This information can be, for example, information relating to the OAuth flow initiated in block 606. In some embodiments, this information does not include the public key created at step 604, rather the public key can, in some embodiments, remain with IAM login in region A, whereas in other embodiments, this public key is passed via IAM global 364 to IAM home 366.

At step 620, IAM home 366 identifies a plurality of domains, and requests, via the user browser, that the user select a domain to login to. At step 622, the user, via the user browser, selects a domain, which domain selection is then submitted at step 624 to IAM home 366 via, the user browser. Also at step 624, IAM home 366 initiates an OAuth flow between IAM login system 372 and IDCS 370, and/or between one of the IAM login instances 362, 364, 366 and IDCS 370. This can be the second OAuth protocol operating within method 600, and is, in some embodiments, embedded within the first OAuth protocol operating between the user browser and the IAM login.

At step 626, the user is directed to IDCS 370, and specifically, IAM home 366 redirects the user browser, via for example, a 303 response, to IDCS 370. At step 628, information is sent from the user browser to IDCS 370. This information can be, for example, information relating to the OAuth flow initiated in block 624. In some embodiments, this information does not include the public key created at step 604, rather the public key can, in some embodiments, remain with IAM login. In some embodiments, and as part of step 628, IDCS 370 can determine whether the application of step 602 is a valid and/or registered application, or in other words, that the application is in fact and IAM application.

At step 630 IDCS 370 provides user with a login page via user browser, and user provides their credentials to login to the browser as indicated in step 632. The user credentials are provided by the user browser to IDCS 370 for authentication as shown in step 634. If the user credentials are authenticated, IDCS 370 provides a 200 Ok response to the user browser and redirects the user browser to IAM home 366 as indicated in step 636. Additionally, the IDCS 370 provides an authorization code "authcode" to the user browser at step 636.

At step 638, authcode is provided by the user browser to the IAM home 366. In some embodiments, this can further include sending of a state of the user browser and/or of the application. In some embodiments, and at step 366 and as a part of the OAuth flow, the user browser provides a code, and specifically the authcode to IAM home 366.

At step 640, IAM home 366 requests a service principal security token (SPST) from the IAM dataplane 368, and at step 642, IAM home 366 receives a service principal security token (SPST) from the IAM dataplane 368. In some embodiments, the request can be made by IAM home 366 with a service principal certificate. IAM home 366 utilizes the SPST to sign a request for a token from IDCS 370 in exchange for authcode at step 644. IDCS 370 validates the SPST and the request with the IAM dataplane 368. IDCS 370 then provides a token, which can be, for example, a JSON web token ("JWT") to IAM home 366 at step 536464. IAM home 366 translates the JWT to an IAM token at step 648.

The user browser directs IAM login, and specifically directs IAM global 364 to store the login information including for example, the tenant, domain, and/or user name in browser storage at step 650. At step 652, IAM login, and as depicted in FIG. 6B, IAM global 364 can redirect the user, and specifically the user browser to the application to which they were logging in along with the token and/or with the authcode. At step 654, login information including for example, the tenant, domain, and/or user name is stored in the browser storage. This information can be received from IAM login, and specifically can be received from IAM global 364.

Exemplary Embodiment

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be setup. In some instances, the provisioning can be done manually, a provisioning tool may be utilized to provision the resources, and/or deployment tools may be utilized to deploy the code once the infrastructure is provisioned.

Figure 7:
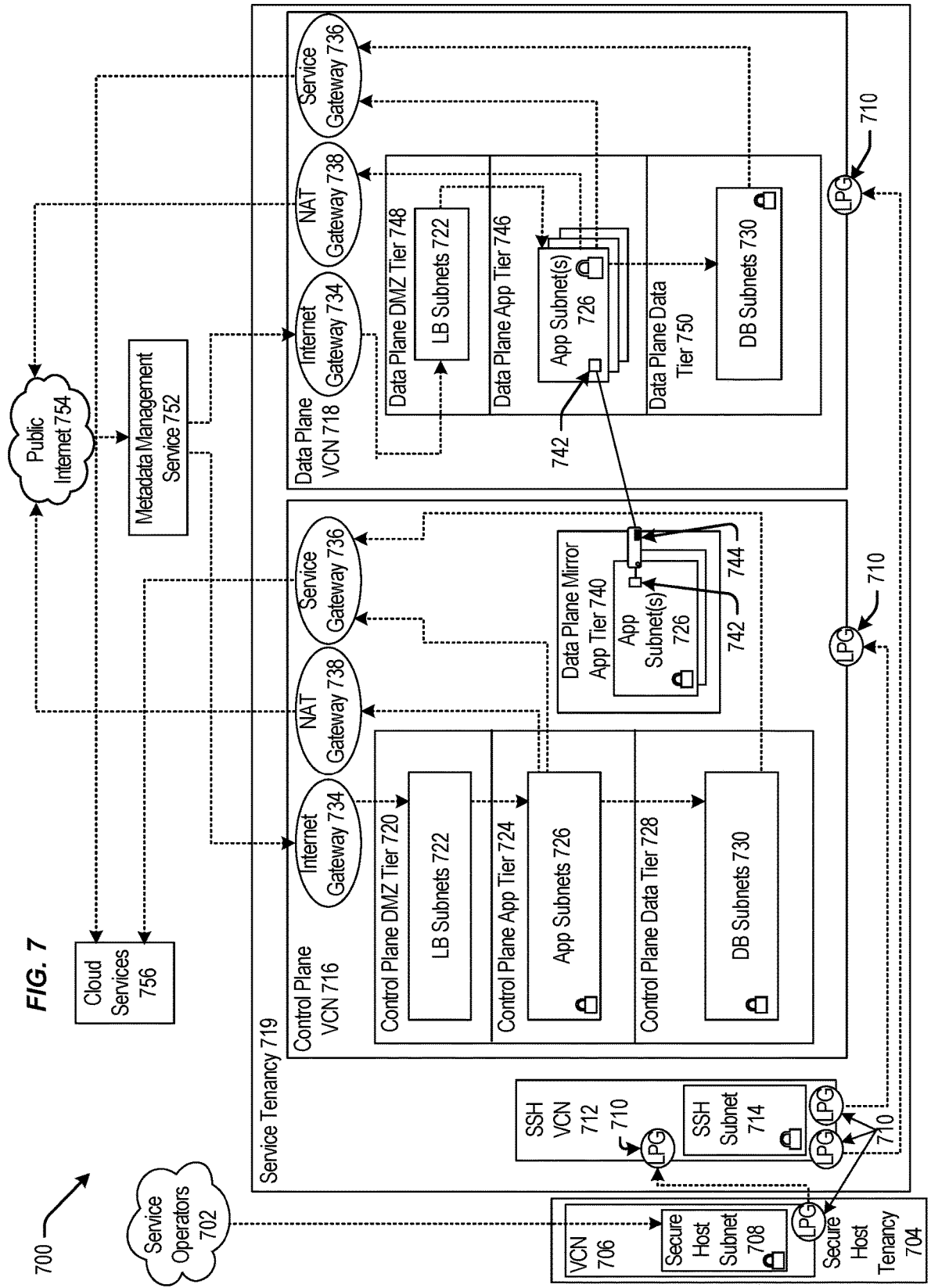
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
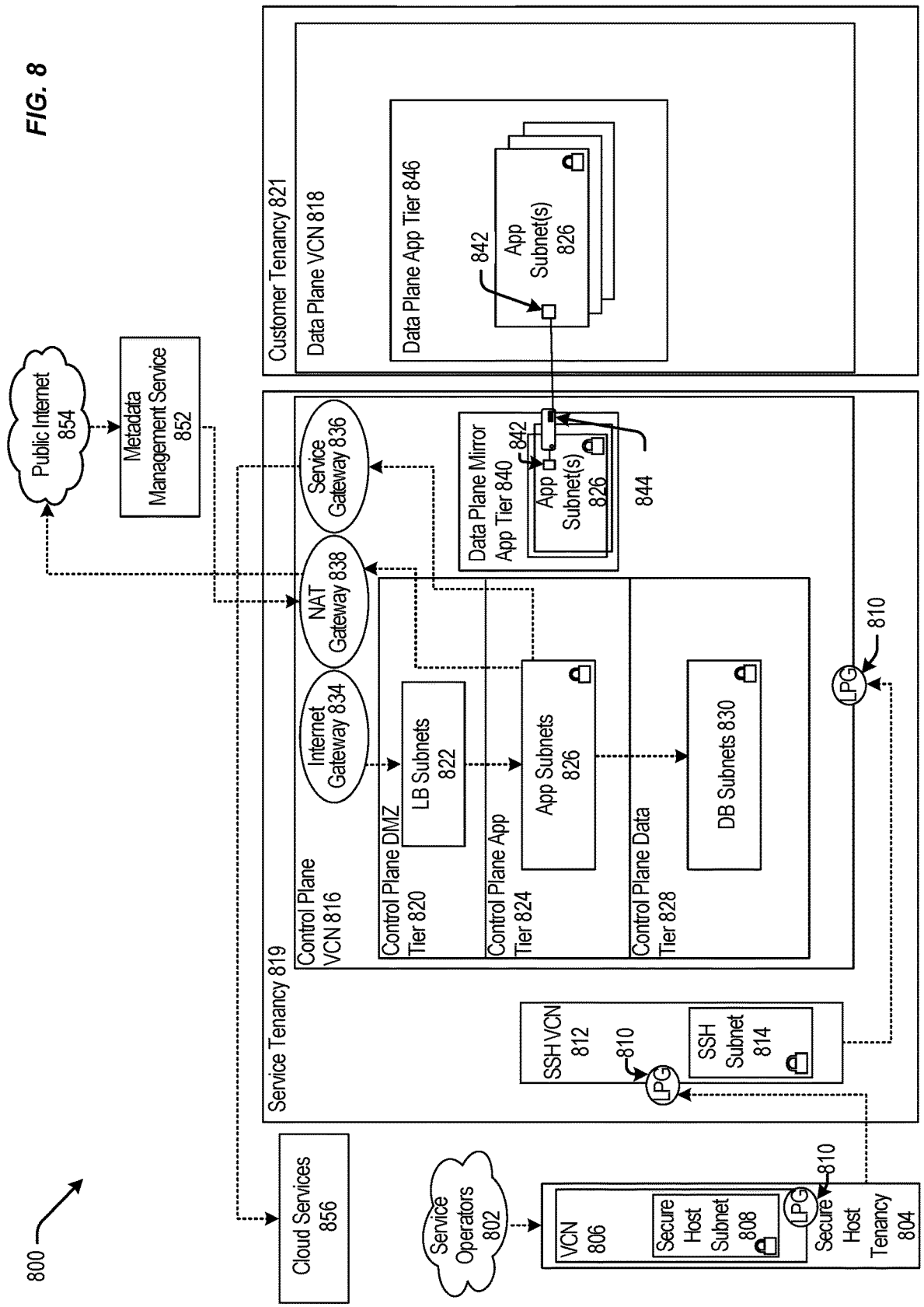
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, which are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
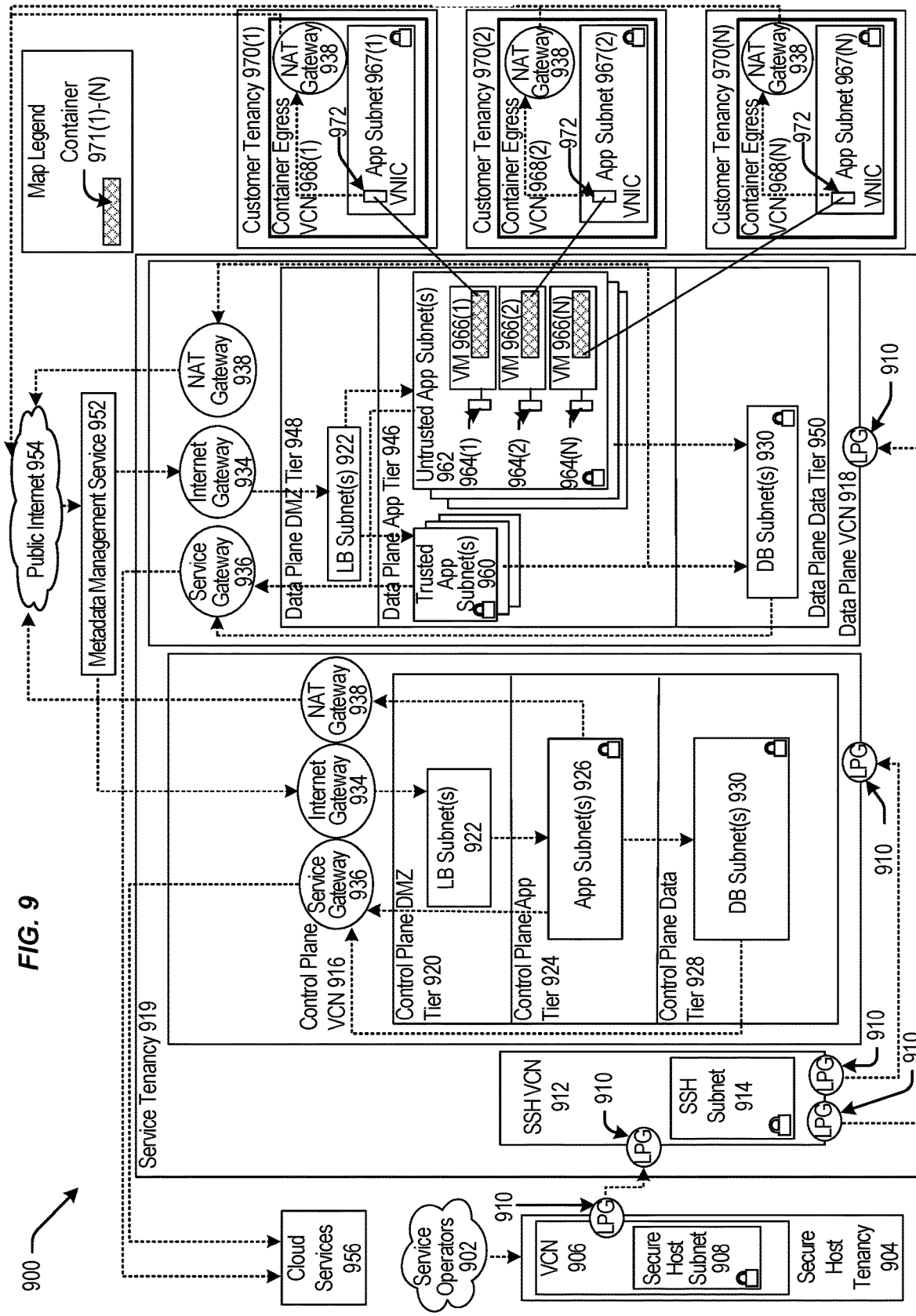
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
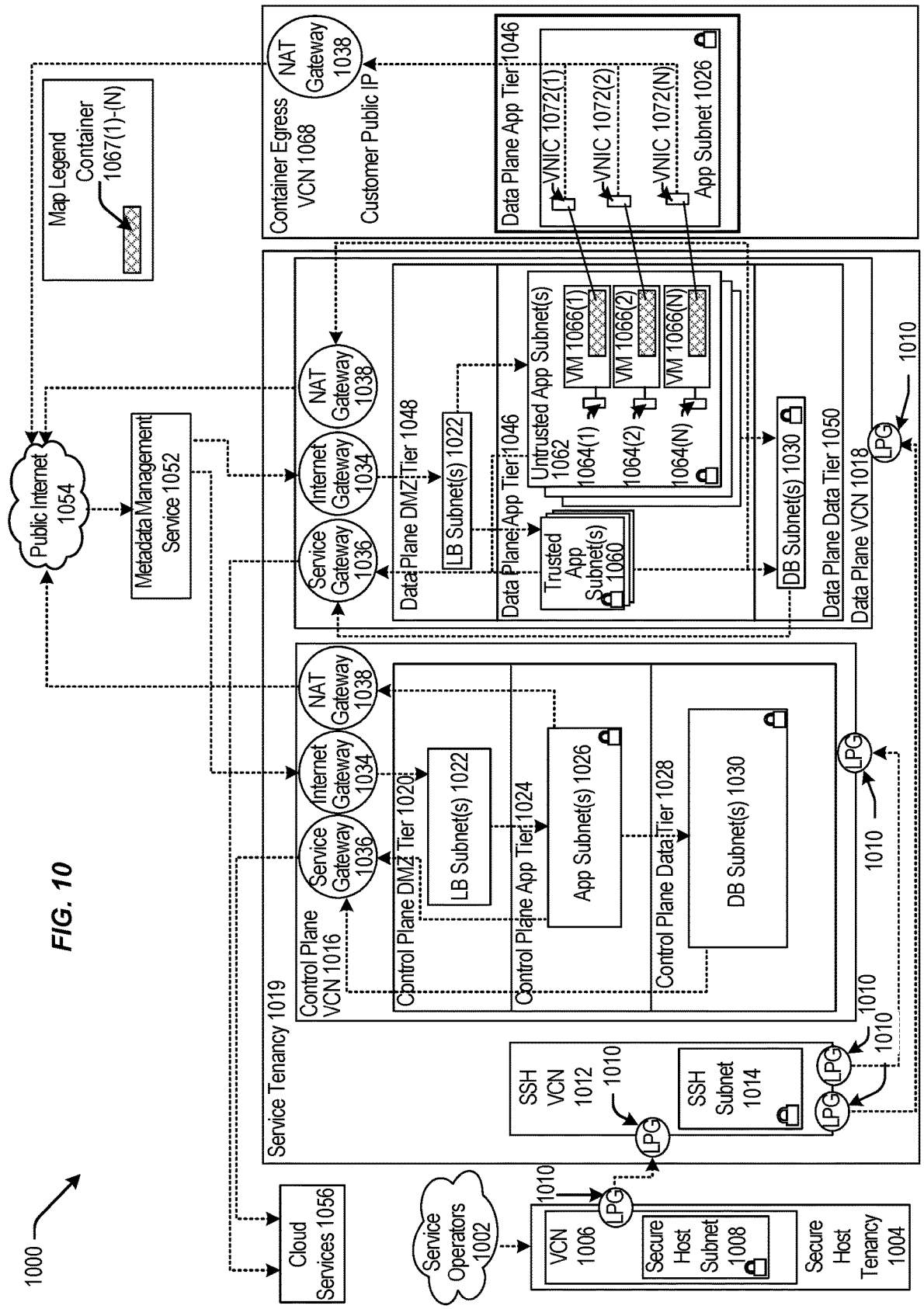
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving a request to access a first application of a first system having a first login protocol, the first system comprising an attribute-based access control ("ABAC") system;
   receiving user login credentials;
   authenticating the user login credentials; and
   logging the user in to the first system and a second system based on the received login credentials, the second system comprising a role-based access control ("RBAC") system, wherein the second system has a second login protocol independent of the first login protocol, wherein logging the user in to the first system and the second system based on the received login credentials comprises generating a public/private key pair with the first application, wherein generating a public/private key pair starts a first OAuth flow between the user and the first system, wherein logging the user in to the first system and the second system based on the received login credential further comprises starting a second OAuth flow between the first system and the second system, and wherein the second OAuth flow is embedded in the first OAuth flow.

2. The method of claim 1, wherein the user login credentials are authenticated by the first system.

3. The method of claim 1, wherein the user login credentials are authenticated by the second system.

4. The method of claim 3, wherein the second system establishes an authenticated session for the user on the first system via an exchange of at least one 0 between the second system and the first system.

5. The method of claim 1, wherein logging the user in to the first system and the second system based on the received login credentials further comprises sending the public key to the first system, and storing the public key in a cache of the first system.

6. The method of claim 5, wherein the cache of the first system is accessible by the first system.

7. The method of claim 5, wherein logging the user in to the first system and the second system based on the received login credentials further comprises receiving an authenticating user credentials with the second system.

8. The method of claim 7, wherein logging the user in to the first system and the second system based on the received login credentials further comprises providing an authorization code from the second system to the first system upon successful authentication of the user credentials with the second system.

9. The method of claim 8, wherein logging the user in to the first system and the second system based on the received login credentials further comprises providing a token from the second system to the first system in response to a request from the first system to the second system, the request including the authorization code.

10. The method of claim 9, wherein logging the user in to the first system and the second system based on the received login credentials further comprises translating the token from a first token type to a second token type, wherein the first token type is compatible with the second system, and wherein the second token type is compatible with the first system.

11. The method of claim 10, wherein logging the user in to the first system and the second system based on the received login credentials further comprises providing the translated token to the user and redirecting the user to the requested application.

12. The method of claim 11, wherein the token provided by the second system to the first system includes the public key.

13. A system comprising:
   a first access control system having a first login protocol, the first system comprising an attribute-based access control ("ABAC") system, the first access control system comprising:
      at least one first processor; and
      a memory comprising a plurality of instructions executable by the at least one first processor, and
   a second access control system, the second system comprising a role-based access control ("RBAC") system, wherein the second access control system has a second login protocol independent of the first login protocol,
   wherein the first access control system is configured to:
      receive a request to access a first application of the first access control system;
      receive user login credentials;
      authenticate the user login credentials; and
      log the user in to the first access control system and to the second access control system based on the received login credentials, wherein logging the user in to the first system and the second system based on the received login credentials comprises generating a public/private key pair with the first application, wherein generating a public/private key pair starts a first OAuth flow between the user and the first system, wherein logging the user in to the first system and the second system based on the received login credential further comprises starting a second OAuth flow between the first system and the second system, and wherein the second OAuth flow is embedded in the first OAuth flow.

14. A non-transitory computer-readable storage medium storing a plurality of instructions executable by one or more processors, the plurality of instructions when executed by the one or more processors cause the one or more processors to:
   receive a request to access a first application of a first system having a first login protocol, the first system comprising an attribute-based access control ("ABAC") system;
   receive user login credentials;
   authenticate the user login credentials; and
   log the user in to the first system and a second system based on the received login credentials, the second system comprising a role-based access control ("RBAC") system, wherein the second system has a second login protocol independent of the first login protocol, wherein logging the user in to the first system and the second system based on the received login credentials comprises generating a public/private key pair with the first application, wherein generating a public/private key pair starts a first OAuth flow between the user and the first system, wherein logging the user in to the first system and the second system based on the received login credential further comprises starting a second OAuth flow between the first system and the second system, and wherein the second OAuth flow is embedded in the first OAuth flow.

* * * * *